United States Patent [19]

Parish

[11] Patent Number: 5,358,782
[45] Date of Patent: Oct. 25, 1994

[54] COEXTRUDED MULTI-LAYERED, ELECTRICALLY CONDUCTIVE POLYIMIDE FILM

[75] Inventor: Darrell J. Parish, Circleville, Ohio

[73] Assignee: E. I. du Pont de Nemours and Company, Wilmington, Del.

[21] Appl. No.: 991,522

[22] Filed: Dec. 15, 1992

[51] Int. Cl.$^5$ ............................................. B32B 27/00
[52] U.S. Cl. .................................... 428/323; 428/332; 428/473.5; 252/511; 524/495; 524/496; 156/244.11; 156/244.21
[58] Field of Search ...................... 428/473.5, 323, 408, 428/220, 334; 156/244.11, 244.21; 252/511; 524/495, 496

[56] References Cited

U.S. PATENT DOCUMENTS

| | | | |
|---|---|---|---|
| 4,568,412 | 2/1986 | Atkins, Jr. et al. | 156/655 |
| 4,606,955 | 8/1986 | Eastman et al. | 428/36 |
| 5,075,036 | 12/1991 | Parish et al. | 252/511 |

FOREIGN PATENT DOCUMENTS

| | | | |
|---|---|---|---|
| 708896 | 5/1965 | Canada | 31/143 |
| 0431636A1 | 7/1990 | European Pat. Off. | B32B 27/34 |

OTHER PUBLICATIONS

J. H. Briston and Dr. L. L. Katan, Plastics Films, *Longman Scientific & Technical*, 2nd ed., pp. 294–299, 1983.
Irving Skeist, Partially or Fully Miscible Substrates, *Handbook of Adhesives*, 3rd ed., p. 40, 1990.

*Primary Examiner*—Paul J. Thibodeau
*Assistant Examiner*—David Abraham

[57] ABSTRACT

An electrically conductive polyimide film having good physical properties and uniform electrical conductivity, prepared by coextruding at least two aromatic polyamic acid solutions, one of which contains a conductive carbon filler, to form a conductive multilayer polyimide film, e.g. a two-layer or three-layer polyimide film.

10 Claims, No Drawings

COEXTRUDED MULTI-LAYERED, ELECTRICALLY CONDUCTIVE POLYIMIDE FILM

BACKGROUND OF THE INVENTION

This invention relates to an electrically conductive polyimide film having good physical properties and uniform electrical conductivity, prepared by coextruding at least two aromatic polyamic acid solutions, one of which contains a conductive filler, to form a conductive multi-layer polyimide film, e.g. a two-layer or three-layer polyimide film.

Conductive polyimide films containing carbon particles are well-known in the art. For example, Canadian Patent 708,896 discloses an electrically conductive polyimide film prepared by blending conductive carbon particles, e.g. carbon blacks, in the precursor polyamic acid; shaping the carbon particle containing polyamic acid into a film; and then thermally converting the polyamic acid into a polyimide film containing the carbon particles.

U.S. Pat. No. 5,075,036, issued to Parish et al on Dec. 24, 1991, discloses an electrically conductive polyimide film containing carbon black and graphite particles uniformly dispersed therein and having a surface resistivity from about 130 to $1 \times 10^{10}$ ohms/square.

In order to obtain surface resistivities of less than 150 ohms/square in such conductive polyimide films, relatively large amounts of conducting fillers such as carbon black, metal powder and/or graphite are normally required. Typically, the concentrations of conductive filler that are required to obtain low resistivities are high enough to weaken the structure of the polyimide substrate. For example, a 1 mil thick unfilled polyimide film has the following properties:

Surface resistivity = $>10^{16}$ ohms/square
Elongation to break = 85%
Elmendorf tear = 20g/mil
MIT fold endurance = 35,000 cycles A 1 mil thick polyimide film containing 30% by weight of carbon black filler particles typically has the following properties:

Surface resistivity = 150 ohms/square
Elongation to break = 9.7%
Elmendorf tear = 1.4g/mil
MIT fold endurance = 300 cycles Therefore, high concentrations of carbon black seriously degrade the physical properties of the conductive polyimide film.

Conversely, lower concentrations of conductive filler particles provide better film properties, but the film thicknesses required to achieve low surface resistivities are quite large, as can be seen from the following relationship:

Surface Resistivity (ohms/square) =

$$\frac{\text{Volume Resistivity (ohm-cm)} \times 393.8 \text{ (conversion factor)}}{\text{Film Thickness (mils)}}$$

Another problem with using low conductive filler concentrations is the influence of the polyimide polymer matrix on the conductive particles. Film surface resistivities can be very non-isotropic, i.e. non-uniform, when measured either directionally or as a function of the test frequency.

Polarity is defined as the difference in electrical resistivities measured in the longitudinal (MD) and transverse (TD) film directions divided by the average resistivity, i.e.

Polarity (%) = Surface Resistivity (MD) –

$$\frac{\text{Surface Resistivity (TD)} \times 100}{\text{Surface Resistivity (Avg.)}}$$

At lower conductive filler concentrations, polarity is very strongly influenced by the degree of stretching or orientation experienced by the film. Consequently, it is possible for a film to have either positive or negative polarity. Although zero polarity is preferred, generally plus or minus eight % is acceptable for most applications.

On the other hand, the resistivity-frequency relationship, defined as taper and being more a function of additive concentration, is not as readily influenced by film orientation. Taper is defined as the differences in resistivities, when measured at 2 and 18 gigahertz, divided by the average resistivity, usually measured at 10 gigahertz. Thus, a conductive polyimide film having an average surface resistivity of 400 ohms/square measured at 10 gigahertz, a maximum resistivity of 480 ohms/square at $10^{18}$ gigahertz and a minimum resistivity of 380 ohms/square at 2 gigahertz has a taper of 0.25 or 25%. As with polarity, zero taper is preferred, but a range of plus or minus 18% is acceptable for most applications.

The object of the present invention is to provide a conductive multi-layer polyimide film prepared by coextruding a conductive carbon filled polyimide layer and one or more unfilled polyimide layers having high conductivity, good taper and polarity while still retaining the good physical properties of the polyimide.

SUMMARY OF THE INVENTION

According to the present invention there is provided a coextruded electrically conductive, multilayered polyimide film comprising a base layer of a first aromatic polyimide containing from 15% to 45% by weight, based on the weight of the polyimide base layer, of finely divided carbon filler particles uniformly dispersed therein and at least one layer of a second unfilled aromatic polyimide, wherein said first and second aromatic polyimides are the same or different and comprise the reaction product of an aromatic tetracarboxylic acid dianhydride and an aromatic diamine.

DETAILED DESCRIPTION OF THE INVENTION

The coextruded multi-layered, electrically conductive polyimide film of the present invention consists of an aromatic polyimide film base layer containing from 15% to 45% by weight of finely divided carbon particles and at least one adjacent unfilled aromatic polyimide film layer.

The multi-layer film of the invention includes both two-layer and three-layer polyimide film structures in which the polyimides constituting the layers are strongly bonded and have substantially continuous unity as will be described hereinafter.

The aromatic polyimide film layers may be the same or may be different, but, preferably, the polyimide film layers are the same.

The aromatic polyimides constituting the base layer and the one or more adjacent layers include any aromatic polyimide obtained by thermal conversion of an aromatic polyamic acid derived from the reaction of a tetracarboxylic acid dianhydride and an aromatic diamine in an organic solvent such as are disclosed in U.S. Pat. Nos. 3,179,630 and 3,179,634, the disclosures of which are hereby incorporated by reference.

Suitable aromatic tetracarboxylic acid dianhydrides for use in the polyimides include: pyromellitic dianhydride; 2,3,6,7-naphthalene tetracarboxylic dianhydride; 3,3',4,4'-biphenyl tetracarboxylic dianhydride; 1,2,5,6-naphthalene tetracarboxylic dianhydride; 2,2'3,3'-biphenyl tetracarboxylic dianhydride; 3,3'4,4'-benzophenone tetracarboxylic dianhydride; 2,2-bis-(3,4-dicarboxyphenyl) propane dianhydride; bis (3,4-dicarboxyphenyl) sulfone dianhydride; 3,4,9,10-perylene tetracarboxylic dianhydride; bis (3,4-dicarboxyphenyl) -propane dianhydride; 1,1-bis (2,3-dicarboxyphenyl) ethane dianhydride; 1,1-bis (3,4-dicarboxyphenyl) ethane dianhydride; bis (2,3-dicarboxyphenyl) methane dianhydride; bis (3,4-dicarboxyphenyl) methane dianhydride; oxydiphthalic dianhydride; bis (3,4dicarboxyphenyl) sulfone dianhydride; and the like.

Suitable diamines for use in the polyimides include: 4,4'-diaminodiphenyl propane; 4,4'-diaminodiphenyl methane; benzidine; 3,3'-dichlorobenzidine; 4,4'-diaminodiphenyl sulfide; 3,3'-diaminodiphenyl sulfone; 4,4'-diaminodiphenyl sulfone; 4,4'-diaminodiphenyl ether; 1,5-diamino-naphthalene; 4,4'-diaminodiphenyl diethylsilane; 4,4'-diaminodiphenysilane; 4,4'-diaminodiphenylethyl phosphine oxide; 4,4'-diaminodiphenyl-N-methyl amine; 4,4'-diaminodiphenyl-N-phenyl amine; 1,4-diaminobenzene (p-phenylenediamine); 1,3-diaminobenzene; 1,2-diaminobenzene; and the like.

A preferred aromatic polyimide used for both the base film layer and the adjacent polyimide layer(s) in both two-layer and three-layer polyimide film structures is derived from the reaction of 4,4'-diaminodiphenyl ether and pyromellitic dianhydride.

Copolyimides derived from any of the aforesaid aromatic tetracarboxylic acid dianhydrides and aromatic diamines can also be used as the polyimide base film layer. Particularly preferred copolyimides are those derived from 30 to 50 mole % of 3,3',4,4'-biphenyltetracarboxylic dianhydride, 50 to 70 mole % of pyromellitic dianhydride, 60 to 80 mole % of p-phenylene diamine and 20 to 40 mole % of 4,4'-diaminodiphenyl ether.

The organic solvent must dissolve one or both of the polymerizing reactants and, preferably, will dissolve the polyamic acid polymerization product. The solvent must, of course, be substantially unreactive with all of the polymerizing reactants and with the polyamic acid polymerization product.

Preferred organic solvents include normally liquid N,N-dialkylcarboxylamides, generally. Preferred solvents include the lower molecular weight members of such carboxylamides, particularly N,N-dimethylformamide and N,N-diethylacetamide. Other useful solvents are N,N-diethylformamide, N,N-diethylacetamide, dimethylsulfoxide, N-methyl-2-pyrrolidone, tetramethyl urea, dimethylsulfone, and the like. The solvents can be used alone or in combinations with one another. The amount of solvent used preferably ranges from 75 to 90 weight % of the polyamic acid, since this concentration has been found to give optimum molecular weight.

The polyamic acid solutions are generally made by dissolving the aromatic diamine in a dry, that is, water free, solvent and slowly adding the tetracarboxylic dianhydride under conditions of agitation and controlled temperature in an inert atmosphere. The diamine is conveniently present as a 5 to 15 weight percent solution in the solvent and the diamine and dianhydride are usually used in about equimolar amounts.

The aromatic polyimide film base film layer contains from 15% to 45% by weight, preferably from 26% to 44% by weight, based on the weight of the aromatic polyimide, of finely divided conductive carbon particles.

Commercial conductive carbon blacks can be used, including acetylene blacks, super abrasion furnace blacks, conductive furnace blacks, conducting channel blacks and fine thermal blacks. A preferred carbon black is Raven ® 16 supplied by the Columbian Carbon Co., which has been size reduced by milling with a high kinetic energy mill to a nominal average agglomerate size of 0.35 microns.

The multi-layered, electrically conductive polyimide film of the invention is prepared by simultaneously extruding streams of a first solution of an aromatic polyamic acid in an organic solvent containing the conductive carbon filler particles uniformly dispersed therein and a second solution of an aromatic polyamic acid in an organic solvent free of conductive carbon filler particles. The feed streams are extruded through a single or multi-cavity extrusion die to form either a two-layer or a three-layer film as described, for example, in European Patent Application 0 431 636. Using a single-cavity die, the laminar flow of the streams must be carefully matched and be of high enough viscosity to prevent comingling of the streams.

In a preferred embodiment of the invention process, both the first and the second aromatic polyamic acid solutions comprise the reaction product of pyromellitic dianhydride and 4,4'-diaminodiphenyl ether in an organic solvent, such as N,N-dimethylacetamide, and wherein the first aromatic polyamic acid solution contains from 15% to 45% by weight, preferably from 26% to 44% by weight, of carbon particles uniformly dispersed therein. The second polyamic acid solutions contains no carbon particles. Both polyamic acid polymers have a solution viscosity ranging from 1400 to 2800 poises, most preferably 1800 to 2400 poises.

The two polyamic acid solutions are continuously extruded through the multi-layer die onto the flat surface of a heated support, for example, a glass or metal plate, a curved surface of a heated support, for example, a peripheral surface of a metal drum, or a flat or curved surface of an endless metal belt, to form a self-supporting two-layer or three-layer film.

The extruded multi-layer film is heated in a profiled manner at temperatures ranging from 90° to 140° C. to produce a self-supporting, partially uncured (green) film.

The self-supporting multi-layer film is subsequently removed from the support and heated at from 100° to 500° C., in a profiled fashion, preferably from 140° to 400° for about 15 to 20 minutes to completely convert the polyamic acid to the polyimide.

The coextruded, multi-layered, electrically conductive polyimide film of the invention has a total thickness in the range of 0.5 to 5.0 mils, preferably 1.5 to 3.0 mils, and the thickness of the carbon filled base film layer ranges from 0.2 to 4 mils, preferably 0.75 to 2.0 mils.

A particularly preferred coextruded, electrically conductive, multi-layered polyimide film of the invention comprises an aromatic polyimide film base layer containing from 26 to 44% by weight of carbon filled particles and two adjacent layers of an unfilled aromatic polyimide wherein the aromatic polyimides are derived from the reaction of pyromellitic dianhydride and 4,4'-diaminodiphenyl ether and wherein the coextruded film has a dielectric strength greater than 300 volts/mil.

The advantageous properties of this invention can be observed by reference to the following examples which illustrate, but do not limit, the invention. All parts and percentages are by weight unless otherwise indicated.

EXAMPLE 1 (COMPARATIVE EXAMPLE 1A)

A 20% solids polyamic acid prepolymer in N,N-dimethylacetamide (DMAC) was prepared by reacting 0.95 mole % of pyromellitic dianhydride (PMDA), based on the theoretical stoichiometric molar equivalence, with 4,4'-diaminodiphenyl ether (DADE).

A slurry was prepared by milling 175 parts of Raven® 16 carbon black particles (Columbia Chemical Co.), 175 parts of the PMDA-DADE polyamic acid prepolymer and 1000 parts of DMAC for 45 to 60 minutes to generate a uniform particle size.

A 6% by weight solution of PMDA in DMAC was added to both the carbon filled and the unfilled PMDA-DADE polyamic acid mixtures to obtain approximately 100% stoichiometric equivalence of PMDA and DADE and a Brookfield solution viscosity of approximately 1000 poises at 40° C.

The two streams of carbon filled and unfilled PMDA-DADE polyamic acid polymers were simultaneously fed to a single-cavity extrusion die at a controlled rate so as to obtain a final thickness of the carbon filled and unfilled polyimide layers of 0.88 mil and 0.60 mil, respectively.

The two polymer streams were extruded onto a stainless steel surface and heated at from 100° to 138° C. over 20 minutes to form a self-supporting film containing 25 to 30 weight % of residual DMAC. Triphenylphosphite (2.5% by weight based on the weight of the polymer) was added to the polyamic acid polymer to facilitate peeling of the film from the stainless steel surface.

The resultant two-layer polyimide film was cured by heating stepwise under restraint at from 90° to 250° C. for from 6 to 27 minutes, preferably 10 to 20 minutes, using convective heating means and from 310° to 370° C. for from 0.7 to 3 minutes, preferably 1 to 2 minutes, using radiant heating means.

Tensile strength and elongation properties of the film were measured according to ASTM-D882, Elmendorf tear was measured according to ASTM D-1922-61T and dielectric strength was measured according to ASTM-149-61. Surface resistivity was measured using a microwave tunnel for AC data.

The results are summarized below for the coextruded two-layer polyimide film of the invention (Example 1) as compared to a single layer carbon filled polyimide film (Comparative Example 1A) having a similar level of electrical resistivity used as a reference.

|  | EXAMPLE 1 | COMPARATIVE EXAMPLE 1A |
|---|---|---|
| Carbon content (weight %) | 27.3 | 26.0 |
| Total film thickness (mils) | 1.47 | 0.99 |
| Surface resistivity (ohms/sq), AC | 680 | 698 |
| Polarity (%) | −6.2 | +4.0 |
| Taper (%) | 14.4 | 16.7 |
| Tensile Strength (Kpsi)) | 22.8 | 12.9 |
| Elongation (%) | 26.8 | 13.6 |

EXAMPLE 2 (COMPARATIVE EXAMPLE 2A)

An electrically conductive, coextruded two-layer polyimide film was prepared as described in Example 1 wherein the thickness of the carbon filled layer was 1.4 mils and the thickness of the unfilled polyimide layer was 0.52 mil. Surface resistivity and physical properties of the two-layer film (Example 2) as compared to a single-layer carbon filled film (Comparative Example 2A) are summarized below:

|  | EXAMPLE 2 | EXAMPLE 2A |
|---|---|---|
| Carbon content (weight %) | 30.6 | 28.2 |
| Total film thickness (mils) | 1.92 | 1.93 |
| Average surface resistivity (ohms/sq), AC | 217 | 184 |
| Polarity (%) | −1.9 | +4.9 |
| Taper (%) | 13.2 | 15.5 |
| Tensile Strength (Kpsi) | 14.7 | 13.5 |
| Elongation (%) | 22.0 | 14.2 |

EXAMPLE 3 (COMPARATIVE EXAMPLE 3A)

An electrically conductive, coextruded two-layer polyimide film was prepared as described in Example 1 having a carbon filled polyimide layer 1.75 mils thick and an unfilled polyimide layer 0.75 mil thick. Surface resistivity and physical properties of the two-layer film (Example 3) as compared to a single-layer carbon filled film (Comparative Example 3A) are summarized below:

|  | EXAMPLE 3 | COMPARATIVE EXAMPLE 3A |
|---|---|---|
| Carbon content (weight %) | 28.6 | 28.0 |
| Total film thickness (mils) | 2.5 | 1.8 |
| Average surface resistivity (ohms/sq), AC | 250 | 235 |
| Polarity (%) | −4.6 | +4.1 |
| Taper (%) | 14.7 | 15.2 |
| Tensile Strength (Kpsi) | 14.0 | 13.2 |
| Elongation (%) | 20.0 | 16.1 |
| Dielectric Strength (volts/mil) | 847 | <100 |
| MIT fold endurance (cycles) | 6200 | 1800 |
| Elmendorf tear (g/mil) | 7.0 | 2.1 |
| Density (g/cc) | 1.4643 | 1.4751 |

The coextruded film has superior elongation, dielectric and tear properties while maintaining comparable resistivity values to the single-layer carbon filled film.

EXAMPLES 4 TO 6 (COMPARATIVE EXAMPLES 4A AND 5A)

An electrically conductive, coextruded, two-layer polyimide film was prepared as described in Example 1 having a carbon filled polyimide film layer 1.49 mils thick and an unfilled polyimide layer 0.64 mil thick. Similarly, two additional two-layer coextruded polyimide films were prepared having carbon filled polyimide layers 2.26 mils thick and unfilled polyimide layers 0.97 rail thick. Surface resistivities and physical properties of the two-layer films (Examples 4 to 6) and comparative results of carbon-filled single layer polyimide films (Comparative Examples 4A and 5A) are summarized below:

|  | EX. 4 | EX. 5 | EX. 6 | COMP. EX. 4A | COMP EX. 5A |
|---|---|---|---|---|---|
| Carbon content (weight %) | 29.6 | 37.5 | 37.5 | 29.4 | 37.4 |
| Total film thickness (mils) | 2.13 | 3.23 | 3.23 | 1.69 | 1.53 |
| Average surface resistivity (ohms/sq), AC | 196 | 77 | 78 | 25.7 | Too brittle to measure |
| Taper (%) | 9.6 | 3.2 | 2.3 | 11.9 | |
| Polarity (%) | −1.0 | −5.1 | −3.5 | +5.4 | |
| Tensile strength (Kpsi) | 14.3 | 14.5 | 14.3 | 12.0 | |
| Elongation (%) | 16.3 | 15.3 | 14.7 | 5.1 | <2.0 |

EXAMPLES 7 AND 8

Three-layer, coextruded electrically conductive polyimide films were prepared as described in Example 1 having carbon filled polyimide layers 1.05 mils and 2 mils thick and outer unfilled polyimide layers 0.81 mil and 1.55 mils thick, respectively. Surface resistivities and physical properties of the three-layer polyimide films are summarized below:

|  | EXAMPLE 7 | EXAMPLE 8 |
|---|---|---|
| Carbon content (weight %) | 37.5 | 44.0 |
| Total film thickness (mils) | 2.67 | 5.1 |
| Surface resistivity (ohms/sq), AC | | |
| MD- | 91 | 24 |
| TD- | 91 | 26 |
| Polarity (%) | 0 | −7.7 |
| Taper (%) | 0 | 0 |
| Tensile Strength (Kpsi) | | |
| MD- | 14.5 | 13.7 |
| TD- | 15.3 | 11.7 |
| Elongation (%) | | |
| MD- | 22.7 | 16.2 |
| TD- | 20.5 | 10.5 |
| Volume resistivity (ohm-cm) | 0.365 | 0.19 |

What is claimed is:

1. A coextruded, electrically conductive, multilayered polyimide film consisting essentially of a base layer of a first aromatic polyimide containing from 15% to 45% by weight, based on the weight of the polyimide base layer, of carbon filler particles uniformly dispersed therein and at least one layer of a second unfilled aromatic polyimide, wherein said first and second aromatic polyimides are the same or different and comprise the reaction product of an aromatic tetracarboxylic acid dianhydride and an aromatic diamine.

2. The coextruded, electrically conductive, multi-layered polyimide film of claim 1 wherein said first and second aromatic polyimides are the same and comprise the reaction product of pyromellitic dianhydride and 4,4′-diaminodiphenyl ether.

3. The coextruded, electrically conductive, multi-layered polyimide film of claim 2 comprising two layers.

4. The coextruded, electrically conductive, multi-layered polyimide film of claim 2 comprising three layers.

5. The coextruded, electrically conductive multilayered film of claim 1 having a total thickness ranging from 0.5 to 5.0 mils.

6. The coextruded, electrically conductive, multi-layered film of claim 1 wherein the thickness of the base film layer ranges from 0.2 to 4.0 mils.

7. The coextruded, electrically conductive, multi-layered film of claim 1 wherein the thickness of said at least one layer of a second unfilled aromatic polyimide ranges from 0.2 to 4.0 mils.

8. The coextruded, electrically conductive, multilayered polyimide film of claim 3 wherein the base layer of a first aromatic polyimde contains from 26% to 44% by weight of carbon particles.

9. The coextruded, electrically conductive, multi-layered polyimide film of claim 4 wherein the base layer of a first aromatic polyimide contains from 26% to 44% by weight of carbon particles.

10. The coextruded, electrically conductive, multi-layered polyimide film of claim 1 wherein the carbon particles have an average size of about 0.35 micron.

* * * * *